Figure 1:
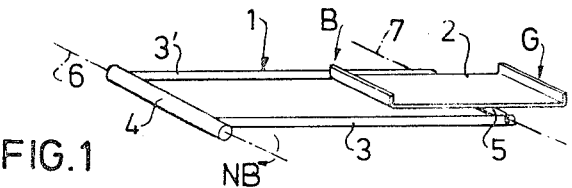

United States Patent [19]

Otteblad et al.

[11] 4,120,387
[45] Oct. 17, 1978

[54] FOOT-OPERATED DEVICE FOR CONTROLLING ENGINE POWER AND BRAKING EFFECT IN MOTOR VEHICLES

[75] Inventors: Sven Ivar Arne Otteblad, Partille; Hans Erik Osborn Brelen, Skövde; Per Folke Magnus Wistrand, Jönköping; Svante Ragnar Samuelson, Göteborg, all of Sweden

[73] Assignee: AB Volvo, Göteborg, Sweden

[21] Appl. No.: 786,569

[22] Filed: Apr. 11, 1977

[30] Foreign Application Priority Data

Apr. 9, 1976 [SE] Sweden .............................. 7604223

[51] Int. Cl.² .................... B60K 41/20; G05G 1/14
[52] U.S. Cl. ......................................... 192/3 S; 74/512
[58] Field of Search ..................... 192/3 R, 3 S, 1; 74/471 R, 512

[56] References Cited

U.S. PATENT DOCUMENTS

| 1,457,489 | 6/1923 | Barton ............................ 192/3 S X |
| 2,620,050 | 12/1952 | Menard ............................... 192/3 S |
| 2,725,962 | 12/1955 | Dillingham ........................ 192/3 S |
| 3,841,427 | 10/1974 | Vita ...................................... 180/98 |
| 3,856,105 | 12/1974 | Lewis et al. ........................ 180/98 |

FOREIGN PATENT DOCUMENTS

| 1,066,435 | 3/1956 | Fed. Rep. of Germany. |
| 1,952,345 | 10/1969 | Fed. Rep. of Germany. |
| 131,475 | 2/1951 | Sweden. |
| 135,011 | 12/1951 | Sweden. |
| 151,288 | 6/1955 | Sweden. |

*Primary Examiner*—Edgar W. Geoghegan
*Attorney, Agent, or Firm*—Young & Thompson

[57] ABSTRACT

A foot-operated device for controlling engine power and braking effect in motor vehicles, said device comprising a pedal being pivotably mounted on a pedal holder about a first axis parallel to the plane of the pedal, and being intended for controlling the engine power and normal vehicle braking with the aid of mutually opposing pedal movements about said first axis which is fixed in relation to the pedal holder. The pedal holder is pivotably mounted in the vehicle about a second axis and is adapted to provide emergency braking at a relatively heavy depression of the pedal in the direction of the lower part of the leg of the vehicle operator by means of the movement of the pedal holder about said second axis as a result of said heavy depression of the pedal.

9 Claims, 8 Drawing Figures

FOOT-OPERATED DEVICE FOR CONTROLLING ENGINE POWER AND BRAKING EFFECT IN MOTOR VEHICLES

The present invention relates to a foot-operated device for controlling engine power and braking effect in motor vehicles.

Different types of such foot-operated devices are known to the art. For the sake of simplicity such a device is termed a combined brake and accelerator pedal for vehicles. Examples of such known pedals with combined functions applicable in this context are to be found in the structures accounted for in the Swedish patent specifications Nos. 131 475, 135 011, 151 288; the German laid-out specification No. 1 066 435 and the German published specification No. 1 952 345; and the U.S. patent specification No. 1 457 489.

In order better to manage an emergency while driving and manoeuvering a vehicle, and particularly a situation causing panic, the driver should always be able to obtain optimum braking effect or emergency braking effect by a strong depression of the pedal in the direction of the lower part of the leg.

In the majority of combined brake and accelerator pedals known to the art, braking does indeed take place by a strong depression of the whole pedal, while engine power takes place by swivelling the pedal about an axis which is either at least generally in the plane of the pedal or is perpendicular thereto. However, a drawback with these structures is that they cause difficulties in providing gentle regulation of vehicle speed, especially when going from engine power to braking effect, and vice versa, since these effects result from mutually independent movements. Automatic control of pedal operation, i.e. vehicle speed, will also be comparatively complicated to achieve in such a combined brake and accelerator pedal.

The object of the present invention is therefore to provide a new type of foot-operated device which does not have the drawbacks with which the known combination pedals are burdened. The problem here is to provide a simple structure, not only enabling gentle control between engine power and braking, as well as automatic control of the pedal, but also enabling the provision of the above-described emergency braking function, i.e. optimum braking effect by a relatively heavy depression of the pedal with the foot in the direction of the lower part of the leg. It must also be possible to operate the device with ergonometrically correct foot movements. The device should also be such that there is the possibility of arranging limits for acceleration and jerks in the vehicle (comfort determining factors) without encroaching on the safety of the braking function. The ability of the device to regulate engine power and braking effect is also to be considered in this connection as including the possibility of regulating the acceleration and retardation of the vehicle instead, if these parameters have been alternatively selected as primary regulating quantities.

Said object can be satisfied according to the invention if the device set forth in the introduction is characterized in that the device comprises a pedal and a pedal holder, said pedal being movably mounted on the pedal holder for controlling the engine power and normal braking with the aid of mutually opposing pedal movements about/along an axis fixed in relation to the pedal holder, said pedal holder being movably mounted in the vehicle and adapted to provide emergency braking at a relatively heavy depression of the pedal in the direction of the lower part of the leg, with the help of the movement of the pedal holder.

Amongst the advantages with a foot-operated device constructed in this way may be mentioned that the driver, without moving the foot between pedals for engine power and braking, can go directly from engine power to braking effect. The device is preferably provided with such power means (springs, damping cylinders etc.) that the driver feels in his pedal foot a force reaction from the pedal such that he is made aware, directly from this pedal force, of the degree of discomfort felt by the passengers in relation to the initiated speed or acceleration alteration. In a sudden emergency there is the possibility for the driver of going directly from the comfort-attuned pedal movement to the special emergency braking function which he thus triggers by an "instinctive" heavy foot movement. The structure also enables relatively simple automatic control of the vehicle speed. If a double-acting force or moment generator is used as operative means, it is namely necessary to use only one such means for executing both braking and throttle opening.

The foot-operated device according to the invention can naturally be made in different ways within the scope of the main claim recited above. A plurality of embodiments are thus characterized by the pedal holder consisting of a lever pivotably mounted in the vehicle. Alternatively, the pedal holder can be displaceably mounted in the vehicle. In both cases it may be suitable for the pedal to be pivotably mounted about an axis parallel to the plane of the pedal. In this case engine power is obtained by pivoting the pedal in one direction about its axis, and normal vehicle braking is obtained by pivoting the pedal about the axis in the other, opposing direction. Instead of being pivotably mounted about an axis parallel to its plane, the pedal can alternatively be swivellably mounted about an axis generally perpendicular to its plane. Engine power now takes place by swivelling the pedal in one direction about its axis and normal vehicle braking takes place by swivelling the pedal in the other, opposing direction about the axis. When the pedal is swivellably mounted about an axis perpendicular to its plane, it can be connected to the pedal holder by means of a rod associated with the pedal.

The normal braking effect and the engine power of the vehicle engine can also be provided with the aid of rectilinear movements of the pedal, the latter then being displaceably mounted in the pedal holder. Engine power then takes place by displacing the pedal in a direction away from or towards the pivoting axis of the pedal holder, and normal vehicle braking takes place by displacing the pedal in the opposite direction to that for engine power.

In order to prevent the driver from accidently initiating the emergency braking function when he only desires normal braking effect, and to provide the force reaction touched on above from the pedal to the driver's foot, there is suitably arranged at least one spring means between the pedal holder and a part rigidly fixed to the vehicle, the spring bias of which means must be overcome to pivot the pedal holder, i.e. to provide emergency braking. For returning the pedal to a neutral position in which neither engine power nor braking action is obtained but only normal idling, there can be suitably arranged at least one spring means on either side of the pivoting axis of the pedal. In combination with, or instead of the spring means, there may be further arranged at least one damping means specially connected to the pedal.

Means for generating pedal force can also be connected to the pedal, and said means can be used for automatically controlling the speed and/or acceleration of the vehicle. Examples of systems for automatic control of a pedal are apparent from the U.S. patent specifications Nos. 3 841 427 and 3 856 105. However, these pedals only control the braking effect.

The means for generating pedal force can also include a spring function and/or a damping function.

In summary it may be said that the foot-operated device according to the invention consists of a combined brake and engine power pedal having two different braking functions with separate characteristics, of which the one braking function which is intended for normal braking of the vehicle is integrated and combined with the engine power function, while the other braking function is solely intended for emergency braking. Regulation of engine power and normal braking action takes place by pedal movements which are of the same kind, but of opposing directions along or about an axis or axial direction.

The invention will now be further explained and exemplified while referring to some embodiments shown on the attached drawing. In consideration of the principle character of the invention all the embodiments shown on the drawing are schematic and are not shown to scale.

Figure 2:
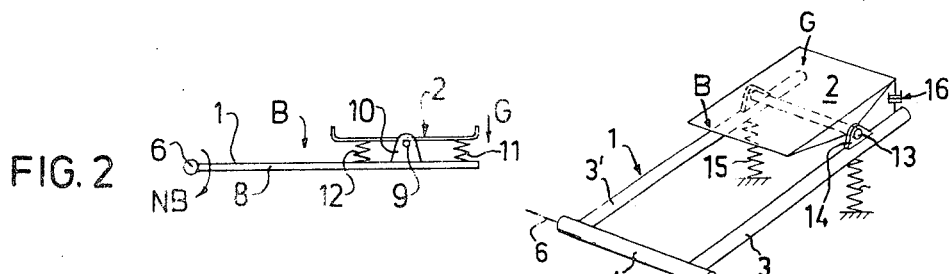
Figure 3:
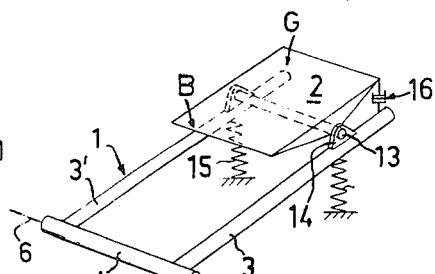
Figure 5:
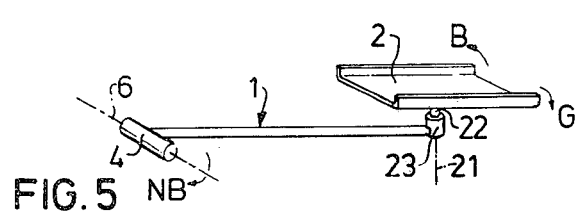
Figure 6:
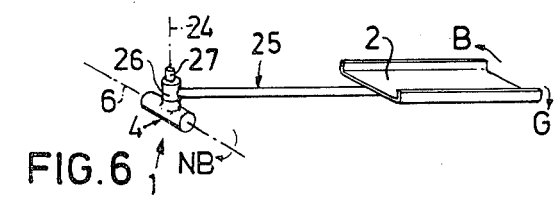
Figure 4:
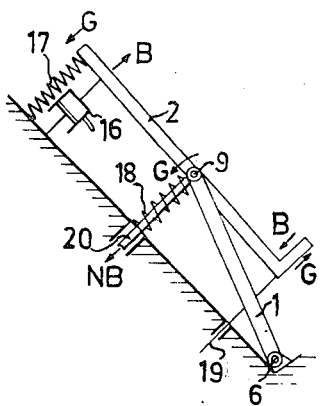
Figure 7:
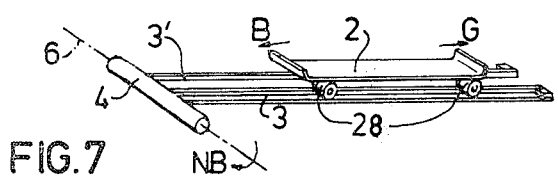
Figure 8:
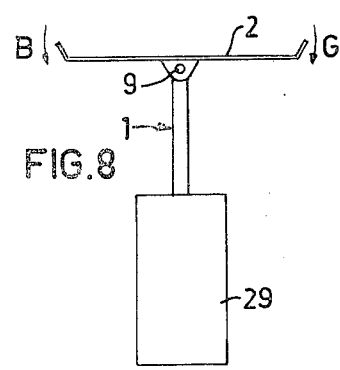

Turning now to the figures, FIG. 1 shows in perspective a first embodiment of the device according to the invention; FIG. 2 shows a side view of a second embodiment of the device according to the invention; FIG. 3 shows more correctly an embodiment which in principle corresponds to the ones shown in FIGS. 1 and 2, the pedal being pivotable about an axis on its underside; FIG. 4 shows a side view of a further embodiment of the device according to the invention; FIGS. 5 and 6 show in perspective two embodiments where the pedal is swivellable and swingable, respectively, about an axis perpendicular to the plane of the pedal, FIG. 7 shows an embodiment of the device according to the invention where the pedal is displaceable reciprocally along the pedal holder; and FIG. 8 shows finally a side view of an embodiment where the pedal holder is displaceable in relation to a rigid part of the vehicle.

For the different embodiments shown in the figures the components or axes corresponding in principle to each other have been given the same reference numerals throughout.

As is apparent, inter alia from FIGS. 1 and 2, the foot-operated device according to the invention has two main parts, namely a pedal holder generally denoted by the numeral 1, movably mounted in the vehicle, and a pedal generally denoted by the numeral 2, movably mounted in the pedal holder 1. In the embodiment according to FIG. 1 the pedal holder 1 is thought of as constituting a lever consisting of two parallel supporting arms 3 and 3', at one end united by a transverse mounting part 4 and at the other by a cross member 5. The mounting shaft 4 of the pedal holder 1 is oscillatable about a first axis 6, fixed relative to the vehicle, and pedal 2 is pivotably mounted on the cross member 5. The pedal holder 1 is further connected to means (not shown) such that an oscillating movement of the part 1 about the axis 6 provides emergency braking (cf. arrow NB) of the vehicle, while pivoting the pedal 2 about the centerline 7 of the cross member 5 provides braking effect (B) in one direction and throttle opening (G) in the other direction about the line 7. It should be noted that by "braking", solely normal braking of the vehicle is intended for the pedal 2. The axis 6 and the centerline 7 are parallel in the embodiment according to FIG. 1.

In the embodiment according to FIG. 2 the pedal holder 1 is thought of as a plate 8 oscillatable about the axis 6, the pedal 2 being pivotably mounted about a shaft 9 a distance in from the free end of the plate 8, the shaft 9 being carried by bearing brackets 10 arranged at the sides of the pedal 2 and attached to the plate 8. Braking effect and throttle opening are obtained by pivoting the pedal 2 about the axis 9 in directions B and G, respectively. Between the plate 2 and the pedal holder 1 there are arranged spring means 11 and 12 for determining the neutral position of the pedal 2 and providing bias when the pedal is pivoted out of the neutral position.

In the embodiment shown in FIG. 3, the pedal 2 is attached to a shaft 13 carried by the bearing brackets 14 attached to the supporting arms 3 and 3'. A compression spring 15 is arranged between a portion fixed to the vehicle and the respective supporting arm in this embodiment, and the combined spring bias from the springs 15 must be overcome for the pedal holder 1 to oscillate about the axis 6. Between at least one of the supporting arms 3, 3' and the pedal 2 there is arranged a means 16 which provides a suitable force against the pedal when it is pivoted from its neutral position.

Turning now to the embodiment of the foot-operated device according to the invention shown in FIG. 4, it will be seen that similar to what is applicable for the embodiments according to FIGS. 1 and 3, the device according to FIG. 4 is such that an alteration of the foot angle and thereby alteration of the angle or attitude of the pedal 2 provides altered throttle opening or normal braking effect, whereas pressing down the whole foot and hereby oscillating the pedal holder 1 about the axis 6 provides emergency braking. Although the embodiment shown in FIG. 4 represents a standing pedal 2 there is naturally nothing to prevent making the device with the pedal 2 hanging.

The device according to FIG. 4 functions in short as follows. When driving, the driver has his foot placed on the pedal 2. The spring bias for the compression of springs 17 and 18, shown in FIG. 4, is so selected that the spring 18 is substantially stiffer than the spring 17. Engine power can hereby easily be regulated by altering the foot angle (altered attitude of the pedal 2, whereby the pedal is pivoted about the axis 9. Depression of the forward part of the foot is hereby arranged to give increased engine power. On the other hand when the whole foot is pressed down with greater force, an oscillation of the pedal holder 1 of the device occurs about the axis 6 to obtain emergency braking. When the driver is to provide this greater pedal force he automatically lessens his foot angle for anatomic reasons, which in turn results in decreased engine power regulated by the wire 19 which also regulates the normal braking function. The depression of the pedal in itself also contributes to this reduction in engine power. In this way there is eliminated the risk of involuntary simultaneous actuation of both throttle and brake. Emergency brake effect is obtained by the axial displacement of the rod 20.

A means 16 is also connected to the pedal 2 according to FIG. 4 for the purpose of generating a pedal force, this means either consisting of an ordinary damper or an actuating means for automatically controlling the speed or acceleration of the vehicle.

In FIG. 5 there is shown a still further embodiment of the device according to the invention, in which the pedal 2 is swivellable in its own plane about the axis 21 for providing normal braking B and engine power G, respectively, the axis 21 being at right angles to the axis 6 of the mounting part 4 for the pedal holder 1. The pedal 2 can suitably be mounted in the mounting sleeve 23 by means of a bearing pin 22, the sleeve 23 being attached to the pedal holder 1, formed as a rod.

In FIG. 6 there is shown an alternative embodiment where the pivoting axis 24 for the movements of the pedal 2 (arrows B and G, respectively) is so arranged that it intersects the oscillating axis 6 of the pedal holder 1. The pedal 2 is hereby connected to the pedal holder 1 by means of a rod or lever 25 attached to the pedal, this rod being swingably mounted via the mounting sleeve 26 to the bearing pin 27 rigidly connected to the mounting part 4.

In FIG. 7 there is shown another conceivable embodiment in which the pedal 2 is movable (see arrows B and G, respectively) in the longitudinal direction of the supporting arms 3, 3' of the pedal holder. This displaceability can be provided, for example, by means of suitable rolling means 28 arranged between the pedal 2 and the supporting arms 3, 3'. In this embodiment, engine power is thus obtained by displacing the pedal 2 in a direction away from the pedal holder axis 6, while normal vehicle braking is done by displacing the pedal 2 towards the axis 6.

In FIG. 8 there is finally shown an embodiment where the pedal holder 1 is displaceably mounted in a cylinder 29 connected to a fixed part of the vehicle, this cylinder suitably constituting a main cylinder associated with the vehicle braking system.

By the foot not needing to be moved from an engine power pedal to a brake pedal when using the device according to the invention, as is normally the case in the vehicles of today, a substantially quicker initiation of the braking effect can be achieved, which is of great importance in a critical situation. The gain in time ought easily to reach several tenths of a second, which can have a deciding role in the possibility of avoiding an accident.

The movement which is utilized in the present structure for providing both normal braking action as well as emergency braking action is a natural and instinctive movement when the driver suddenly discovers an obstacle. In a case where the driver panics, it happens unfortunately all too often that a less experienced driver steps on the engine power pedal (accelerator pedal) instead of the brake pedal. This risk ought to be completely eliminated by a structure according to the invention.

It can also be of importance that both braking and engine power in the majority of the described embodiments is achieved with the same kind of movements which have so far been used in pedal structures. An experienced driver therefore only needs a very short time to accustom himself to the structure according to the invention.

Finally it should be observed that the very schematic embodiments described above are in no way intended to limit the scope of the invention as defined by the following claims, within the framework of which the device according to the invention can be given multifarious embodiments not accounted for above.

What we claim is:

1. A foot-operated device for controlling engine power and braking effect in motor vehicles, characterized in that the device comprises a pedal (2) and a pedal holder (1), said pedal (2) being movably mounted on the pedal holder (1) for controlling the engine power (G) and normal braking (B) with the aid of mutually opposing pedal movements about/along an axis (7; 9; 13; 21; 24; 3) fixed in relation to the pedal holder (1), said pedal holder (1) being movably mounted in the vehicle and adapted to provide emergency braking (NB) on a relatively heavy depression of the pedal (2) in the direction of the lower part of the leg, with the help of the movement of the pedal holder (1).

2. A device as claimed in claim 1, characterized in that the pedal holder (1) consists of a lever pivotably mounted in the vehicle (FIGS. 1-5, 7).

3. A device as claimed in claim 1, characterized in that the pedal holder (1) is displaceably mounted in the vehicle (FIG. 8).

4. A device as claimed in claim 1, characterized in that the pedal (2) is pivotably mounted about an axis parallel to the plane of the pedal (FIGS. 1-4, 8).

5. A device as claimed in claim 1, characterized in that the pedal (2) is pivotably mounted about an axis (21; 24) generally perpendicular to the plane of the pedal (2) (FIGS. 5,6).

6. A device as claimed in claim 5, characterized in that the pedal (2) is connected to the pedal holder (1) by a rod (25) associated with the pedal (FIG. 6).

7. A device as claimed in claim 1, characterized in that the pedal (2) is displaceably mounted on the pedal holder (1) (FIG. 7).

8. A device as claimed in claim 1, characterized in that the pedal (2) is connected to at least one damping means (16).

9. A device as claimed in claim 1, characterized in that a means (16) is connected to the pedal (2) for generating pedal force, said means (16) being capable of use for automatically controlling the speed and/or acceleration of the vehicle.

* * * * *